United States Patent [19]
Person

[11] 4,452,531
[45] Jun. 5, 1984

[54] METHOD AND MEANS OF DETERMINING ACCELERATION

[75] Inventor: Herman R. Person, Columbus, Nebr.

[73] Assignee: Dale Electronics, Inc., Columbus, Nebr.

[21] Appl. No.: 82,001

[22] Filed: Oct. 5, 1979

[51] Int. Cl.³ ............... G01P 15/00; G01P 15/08; G01P 3/36; G01P 3/42
[52] U.S. Cl. ............... 356/28.5; 73/516 LM; 73/517 R; 324/162; 324/175; 356/350
[58] Field of Search ............ 356/5, 28, 28.5, 350; 324/162, 175; 73/516 LM, 517 R

[56] References Cited

U.S. PATENT DOCUMENTS

| | | |
|---|---|---|
| 3,102,953 | 9/1963 | Wallace .......................... 356/350 |
| 3,409,369 | 11/1968 | Bickel .......................... 356/28.5 |
| 3,433,568 | 3/1969 | Skalski et al. ................. 356/350 |
| 3,846,025 | 11/1974 | Wilber .......................... 356/350 |
| 4,189,233 | 2/1980 | Hurt et al. ..................... 356/5 |

Primary Examiner—S. C. Buczinski
Attorney, Agent, or Firm—Zarley, McKee, Thomte, Voorhees & Sease

[57] ABSTRACT

A method and apparatus having a frequency transmitter, a frequency receiver, an oscillator tuned to the same frequency as the frequency transmitter, and a frequency differential measuring unit to measure frequency changes between emitted signals to determine changes in velocity.

7 Claims, 5 Drawing Figures

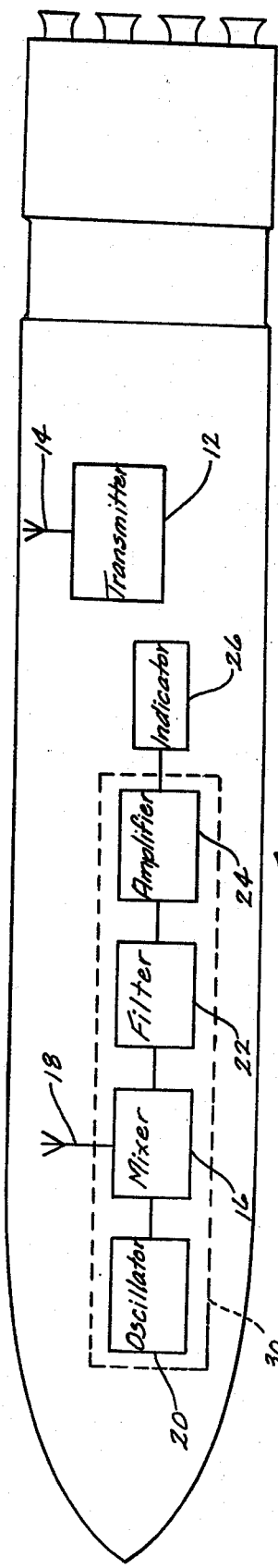
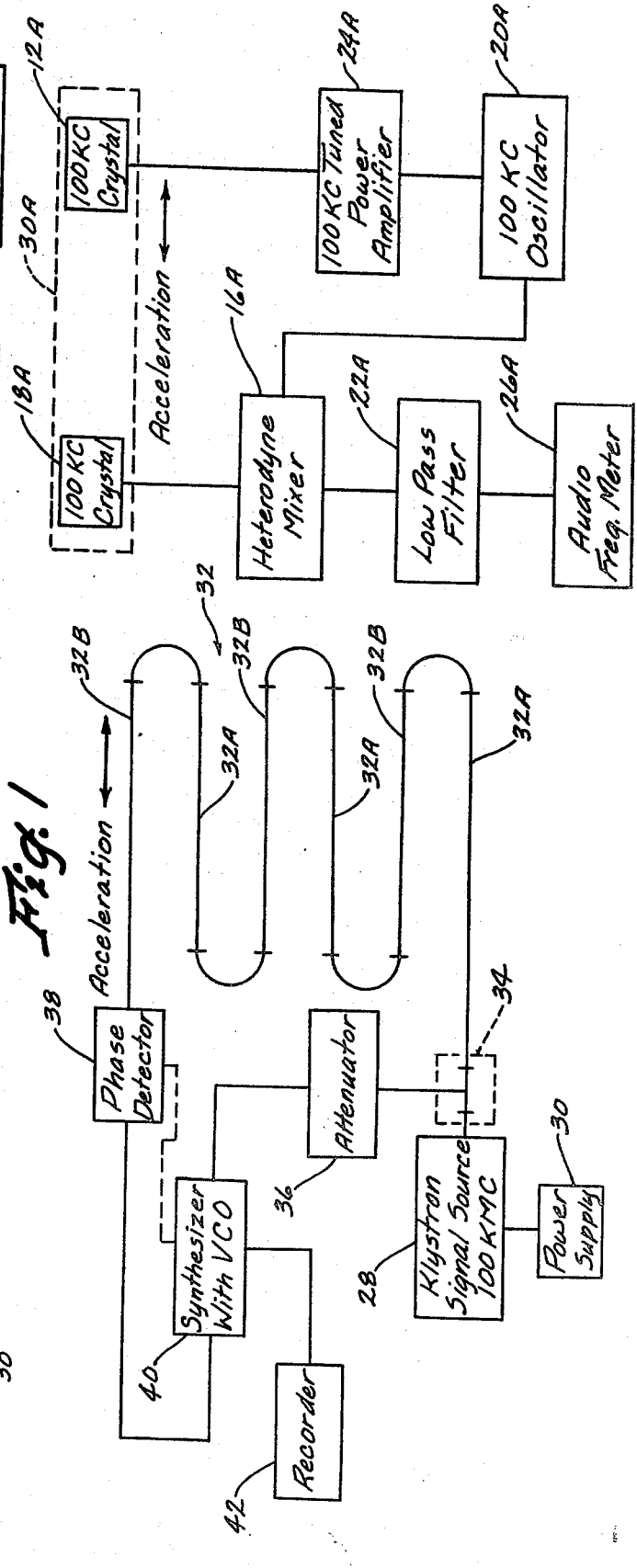
Fig. 1
Fig. 2
Fig. 3

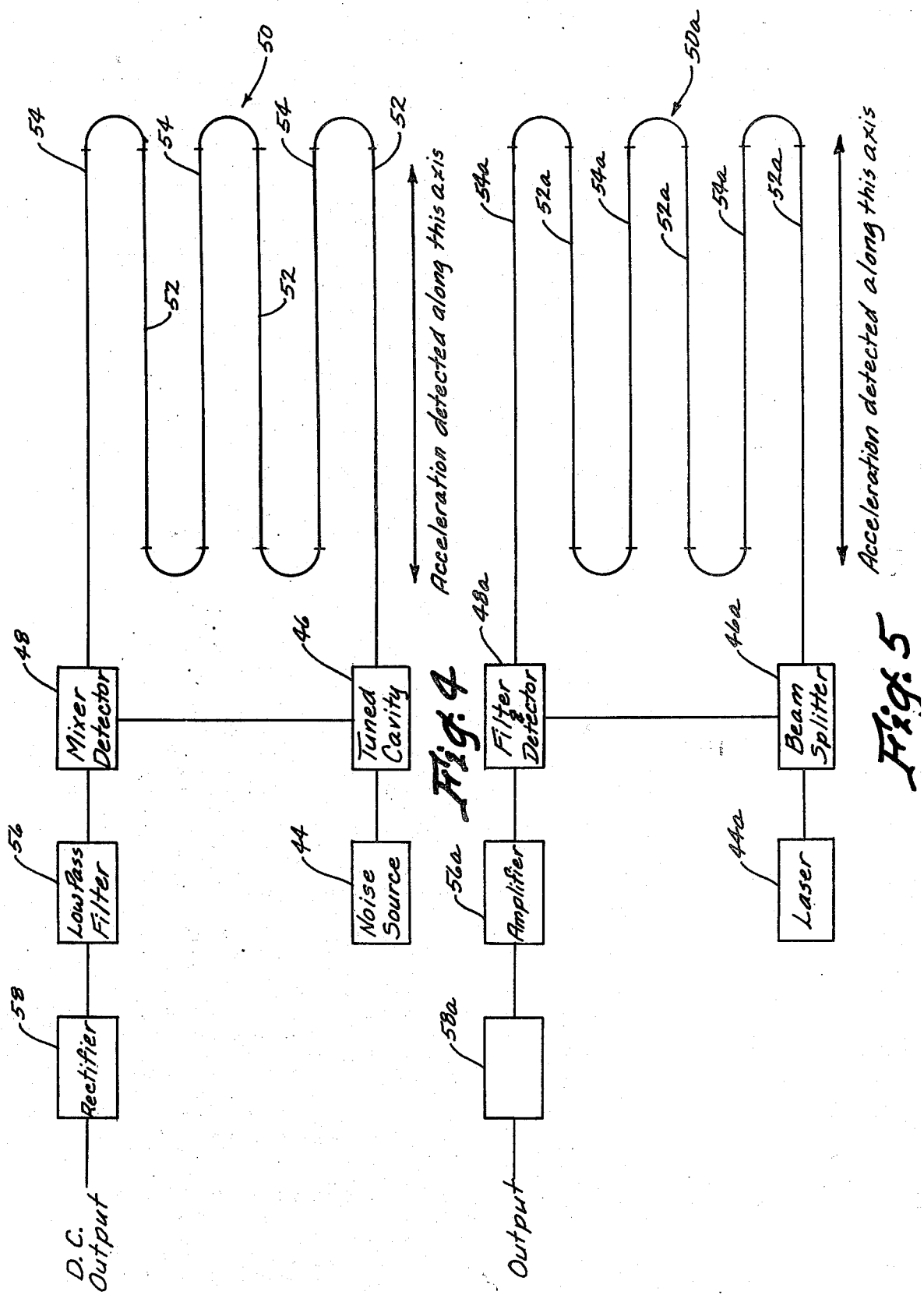

METHOD AND MEANS OF DETERMINING ACCELERATION

BACKGROUND OF THE INVENTION

This invention relates to a device for measuring acceleration of a vehicle which is particularly adaptable for use in spacecraft. Accelerometers heretofore known in the art have substantially all been of the mechanical "inertia" type. It is well known that such accelerometers are all incapable of exact accuracy. More specifically, this invention relates to an accelerometer that can measure acceleration by means within the vehicle itself through audio, radio or laser or (light) frequency signals.

SUMMARY OF THE INVENTION

In accordance with the present invention an improved method and means of determining acceleration is provided. A wave frequency emitter capable of emitting audio, radio or laser waves is located on the vehicle which is to have its acceleration monitored. A wave frequency receiver means is also provided in said vehicle in spaced relation to the frequency emitter. The frequency emitter is adapted to emit signals both directly and through space to the receiver means. Further, means are provided to measure the difference between the wave frequency presented directly to the receiver means and the wave frequency emitted through space to the receiver means, with the wave frequency difference being proportional to the acceleration of the vehicle according to the formula:

$$\Delta f = f - f_1 = f - f + (fSa/C^2) = (fSa/C^2)$$

where
C = the velocity of the wave frequency energy;
f = the frequency of the transmitted signal;
$f_1$ = the frequency of the transmitted wave as it is received by the receiver;
a = acceleration;
S = the distance between emitter and receiver; and
(S/C) = the time for energy to travel between emitter and receiver.

Therefore, one of the principal objects of this invention is to provide an accelerometer which utilizes audio, radio or laser frequency signals which are affected by acceleration and which can be computed by a derived equation based upon doppler phenomena.

A further object of this invention is to provide an accelerometer that is independent of mechanical contrivances of the inertia type.

A still further object of this invention is to provide an accelerometer that is independent of the gravitational attraction of the earth or any celestial body.

A still further object of this invention is to provide an accelerometer that will permit measurement of changes in acceleration by means of equipment of the vehicle itself without reference to planets, stars or other bodies outside the vehicle.

A still further object of this invention is to provide an accelerometer that will maintain substantially absolute accuracy even when subjected to the gravitational attraction of objects having gravitational characteristics.

A still further object of this invention is to provide an accelerometer that will maintain substantially absolute accuracy during a given flight interval.

These and other objects will be apparent to those skilled in the art.

BRIEF DESCRIPTION OF THE DRAWINGS

This invention consists in the construction, arrangements and combination of the various parts of the device and steps in its operation, whereby the objects contemplated are attained as hereinafter more fully set forth, specifically pointed out in the claims, and illustrated in the accompanying drawings, in which:

FIG. 1 is a diagrammatical illustrated side view of the components of this invention as embodied in a vehicle;

FIG. 2 is a schematic drawing of a practical embodiment of the invention utilizing radio frequency or similar energy signals;

FIG. 3 is a schematic drawing showing the principle of this invention embodied in an audio signal system;

FIG. 4 is an alternate design showing a practical embodiment of this invention suitable for use with radio frequency signals; and FIG. 5 is a further alternate design showing the use of laser energy.

DETAILED DESCRIPTION OF THE PREFERRED EMBODIMENT

With reference to the drawings, the numeral 10 generally designates the space vehicle in which the accelerometer is installed. The numeral 12 generally designates an ordinary electronic wave transmitter of the accelerometer and which is disposed within the vehicle 10. The transmitter 12 may utilize any suitable transmitting antenna, generally designated by the numeral 14. The numeral 30 generally designates an electronic wave receiver of the accelerometer and which is disposed within the vehicle 10. The receiver 30 may utilize any suitable receiving antenna, designated by the numeral 18. The receiver 30 and its antenna 18 are adapted to receive the frequency emitted by the transmitter 12 and its antenna 14 and they are disposed in spaced relation thereto. The transmitter 12 is adapted to emit any suitable frequency at a constant rate.

The numeral 20 generally designates an oscillator having a frequency exactly identical to the frequency of the transmitter 12. The frequency emission of the oscillator 20 passes by wiring connections into the mixer 16. Impulses detected by the mixer 16 by wiring connectors pass to and through the low-pass filter 22 which passes only the frequency difference between the oscillator frequency and the frequency from the transmitter 12 as it is received by the mixer 16. This frequency difference thence passes on to and through the amplifier 24 by wiring connections and thence to any suitable indicator means 26.

As noted hereinabove, the frequency of the transmitter 12 and the oscillator 20 are the same. Therefore, when the vehicle 10 is not accelerating, the signal output from the amplifier will be substantially zero due to the fact that the voltage impulse developed across the detecting element of the mixer 16 will have the frequency of the transmitter frequency superimposed on the identical oscillator frequency and, hence, no difference frequency to amplify. As the vehicle 10 begins to accelerate, there will occur a change in the velocity of the vehicle 10. Therefore, there will be, as the vehicle 10 accelerates, a change in its velocity in the time the transmitting antenna 14 emits its radio frequency energy and the time that the receiving antenna 18 receives it. The change in the velocity of the vehicle 10 will, by doppler effect, change the wave length and thereby the frequency of the signal received by the receiver 30 from the transmitter 12. Hence, the signal received by the receiver 30 from the transmitter 12 will be of a different frequency than the frequency of the oscillator 20 and will be proportional to the value of the acceleration experienced. Therefore, there will be a difference frequency developed by the difference between the frequency signal from the transmitter 12, as it is received by the receiver 30, and the frequency of the oscillator 20. This will, in turn, create a difference voltage across the detector or mixer 16 which will be passed through the lowpass filter 22, through the amplifier 24 and can be measured by any suitable indicator, meter or other registering device at 26.

The above mentioned difference frequency between the received signal and the oscillator frequency can be properly shown to be proportional to the acceleration of the vehicle 10 by means of the mathematical proof included hereinbelow:

"C" equals the velocity of the radio frequency energy.
"λ" equals the wave length of the transmitted signal.
"f" equals the frequency of the transmitted signal (and also the same frequency of the BFO oscillator 20 in the receiver 30).
"$f_1$" equals the frequency of the transmitter 12 as it is received by the receiver 30.
"a" equals acceleration.
"$\Delta f$" equals "$f - f_1$".
S = distance between the two antennas 14 and 18.
(S/C) = t = Time for energy to travel between antennas.
Therefore:
ta = $\Delta v$ = change in Velocity in time "t".
f = (C/λ) or λ = (C/f)
Therefore:

$$f_1 = \frac{C + \Delta v}{\lambda} = \frac{C + \Delta v}{\frac{C}{f}} = f + \frac{F\Delta v}{C} =$$

$$f + \frac{fta}{C} = f + \frac{fSa}{C^2}$$

Therefore:

$$\Delta f = f - f_1 = f - f + (fSa/C^2) = (fSa/C^2)$$

Those skilled in the art will readily ascertain from the above final equation for the change in frequency, that the change in the frequency is proportional to the frequency of the transmitter 12 and the distance between the antenna 14 and 18 and the acceleration of the vehicle 10, and inversely proportional to the square of the velocity of the wave between the antennas.

DESCRIPTION OF ALTERNATE EMBODIMENTS

A practical embodiment of an accelerometer could be made with radio frequency energy is shown in FIG. 2. A 100 KMC klystron signal source 28 is connected to a power supply 30, and is also connected to a series of wave guides 32 through power splitter 34. Guides 32 replace the antennas 14 and 18 of FIG. 1, and the cumulative length of guides 32 also represents the distance between the two antennas. The wave guides 32A are filled with air and the wave guides 32B are comprised of a suitable dielectric material such as glass or other ceramic material. The signal which passes through the wave guides is substantially decreased in velocity and attenuated, which decreases the value of $C^2$ in the basic equation, which increases the resulting value of $\Delta f$. The attenuator 36 receives the signal from source 28 through power splitter 34, and the attenuator output signal is adjusted to the approximate power level emitted to the phase detector 38 from the wave guides 32.

The phase detector 38, synthesizer 40 (voltage controlled oscillator—VCO) and recorder 42 function in conventional fashion (see *General Radio Experimentor*, infra) to measure the difference in frequency between the frequency emitted from the wave guides 32 and the frequency emitted from the attenuator 36. The recorder 42 will read the output of the synthesizer 40 and can be calibrated to any convenient units of acceleration. This accelerometer would be capable of measuring accelerations of upwards of 100 "G's" for several seconds.

Since the phase detector 38, synthesizer 40 and recorder 42 are of conventional construction, their precise operation is not described here, other than the synthesizer feeds to the recorder the difference in frequency between the outputs of the phase detector 38 and the attenuator 36.

The velocity of propogation of the energy through the air wave guides 32A approaches the speed of light, whereas the velocity of propogation of the energy through the dielectric filled wave guides 32B of the assembly 32 is much less and is inversely proportional to the dielectric constant of the dielectric material. The change in frequency due to the air dielectric wave guides 32A is much less than the change of frequency due to the dielectric-filled wave guides 32B, thereby creating an increase in the amount of over all change in, or difference of frequency. The following is a derivation of the equation to show the total frequency change.

$\Delta f$ equals the output frequency to the recorder. It is the difference frequency between the wave coming from the wave guide (f') 32B and the wave coming from the alternator (f).

$$\Delta f = f' - f \qquad f' = \frac{C + \Delta v}{\lambda}$$

Where:
C = Velocity of wave in wave guide.
C' = Velocity of wave in dielectric filled wave guide.
$\Delta v$ = change in velocity of vehicle during the time the wave leaves the generator and it reaches the detector (t).
$\Delta v$ = a t where a equals the acceleration of the vehicle.
and $$\Delta v = a\left(\frac{S}{C} + \frac{S'}{C'}\right)$$

where S equals the total length of the air filled wave guide and S' equals the total length of the dielectric filled wave guide (S' is understood to be positive or negative depending on whether wave propogation therein is in the same or opposite direction, respectively, of the length S)

Therefore:

$$\Delta f = f - \frac{C + a\left(\frac{S}{C} + \frac{S'}{C'}\right)}{\lambda} \quad \text{then substitute } \frac{C}{f} \text{ for } \lambda$$

$$\Delta f = f - \frac{C + a\left(\frac{S}{C} + \frac{S'}{C'}\right)}{\frac{C}{f}}$$

Therefore $$\Delta f = fa\left(\frac{S}{C^2} + \frac{S'}{CC^1}\right)$$

Another form of this accelerometer would be to use all dielectric filled wave guides. In this case, the equation would reduce to:

$$\Delta f = fa\frac{S'}{C^2}$$

A variation of structure for a doppler effect accelerometer that is still within the scope and concept of this invention is shown in FIG. 4. In this type of configuration the radio transmitter 12 is replaced by a noise source 44 in operative communication with a tuned cavity 46. The energy from the tuned cavity 46 is fed to a detector means 48 through an assembly of wave guides, generally designated by the numeral 50. The wave guide assembly 50 replaces the antennas 14 and 18 and also the distance between the antennas 14 and 18. The wave guide assembly is composed of air dielectric wave guides, generally designated by the numeral 52, and dielectric filled wave guides, generally designated by the numeral 54. The detector means 48 takes the place of the receiver 30 and is adapted to act as a mixer for the signals coming from the tuned cavity 46 via the wave guide assembly 50. The velocity of propogation of the energy through the air wave guides 52 approaches the speed of light, whereas the velocity of propogation of the energy through the dielectric filled wave guides 52 of the assembly 50 is much less because of the dielectric constant of the dielectric material. The change in frequency due to the air dielectric wave guides 50 is much less than the change of frequency due to the dielectric-filled wave guides 54, thereby creating an increase in the amount of over all change in, or difference in frequency.

The frequency energy from the assembly 50 is picked up and passed through the detector-mixer 48 and thence to the low pass filter and amplifier generally designated by the numeral 56, which only allows the difference frequency to pass on to the rectifier, generally designated by the numeral 58, to be rectified for a D.C. electrical output which, as seen above, will be proportional to the acceleration of the vehicle.

An audio powered doppler accelerometer is schematically illustrated in FIG. 3 of the drawings. The components in FIG. 3 correspond substantially to the components of FIG. 1, and the components in FIG. 3 that correspond to like components of FIG. 1 have been identified with the same numerals but with the suffix "A" thereafter. A receiver 30A is comprised of an aluminum tube 6 to 8 inches in diameter and 1 to 10 feet long. The acceleration of the vehicle in question will be in the direction of the longitudinal axis of the tube 30A. An ultrasonic generator 12A (100 KC Crystal) is mounted in any convenient fashion inside the tube 30A and away from one of its ends. An ultrasonic detector 18A (100 KC Crystal) is similarly mounted in the other end of the tube. The aluminum tube 30A serves to insulate the ultrasonic generator and detector from interferring frequencies and to prevent interferring reflections of wave frequencies. As shown in FIG. 3, the generator 12A is operatively connected to the power amplifier 24A which in turn is operatively connected to the oscillator 20A. The oscillator 20A is directly electrically connected to the mixer 16A which, like mixer 16 in FIG. 1, receives both the emitted signal from the ultrasonic generator and a constant signal from the detector 18. The signals received by mixer 16A pass through the filter 22A and any frequency differential is read out on meter 26A similar to the manner contemplated in the description of the components of FIG. 1. The audio frequency meter 26A is calibrated in feet per second per second.

Equipment for measuring frequency differentials through the audio range and electromagnetic range have long been known in the art, and as long ago as 1942, Meacham of Bell Laboratories was able to measure one part in $1 \times 10^{10}$ (Electronic Measurements, by Frederick Terman, see chapter on frequency measurements, and section on heaterdyne frequency measurements).

The use of radio frequency signals obviously requires the use of sensitive equipment to measure frequency differentials, but such equipment is and has been readily available in the industry. See *The General Radio Experimenter*, Vol. 41, No. 1, January, 1967, p. 7, wherein equipment is described capable of measuring frequency variations in as small a value as a few parts in $10^{12}$.

FIG. 5 sets forth the use of a laser system. The numeral 44A is a laser source directed to a beam splitter 46A which is adapted to split the laser beam and direct a portion of the beam directly to filter and detector 48A, and a portion to guide assembly 50A. Wave guides 52A can be fiber optics with a high dielectric constant, and wave guides 54A can be air filled tubes, vacuum tubes, or fiber optics with a low dielectric constant. While the guide assembly is shown to be serpentine in configuration, other configurations could be utilized. The purpose to be achieved is to delay the signal through the assembly 50A and to keep the signal in the assembly as long as possible.

The two frequencies received by filter and detector 48A are amplified by amplifier 56A and conveyed suitable digital or analog outlet electronics 58A whereupon the output is provided which is proportional to the acceleration of the vehicle as was the output of the system of FIG. 4.

Member 48A could be a photo-multiplier tube which would receive one laser beam from number 46A and another beam from assembly 50A. The output of the photo-multiplier tube would then be the frequency difference between the two beams. This output could then be rectified and put on a meter scope, or other suitable means for visually indicating the acceleration that occurs.

Another variation of a lawer type of accelerometer would be to use high dielectric constant fiber optics through the whole system. Using this type of arrangement acceleration about an axis could be measured if the fiber optics were arranged in a circle or linear acceration could be measured if the fiber optics were arranged as shown in the drawings. The equation to determine the change in frequency is:

$$\Delta f = (S'fa/C^2)$$

where:
s' = length of fiber optics
f = frequency of laser
a = acceleration of vehicle
C' = velocity of wave in the fiber optics.

PRACTICAL TEST

The following test was conducted to verify the measurement of frequency differential according to the above-derived equations wherein audio frequencies were used.

With reference to FIGS. 1 and 2 shown in the drawings set forth below, a paper tube approximately 12 feet long with a 4 inch inside diameter was utilized in lieu of the aluminum tube 30A in FIG. 3 of the patent drawings, and a loud speaker was mounted in one end thereof to serve as a transmitter, with a microphone mounted in the other end thereof to serve as a receiver. The relationship of the components of the test are illustrated in FIG. 1 of the drawing set forth below. The loud speaker and the microphone are mounted inside the tube 10 feet 4 inches apart.

A general radio oscillator GR was used to drive a power amplifier to drive the loud speaker. The output of the microphone was put into the vertical amplifier of a type 541A Tektronix oscilloscope. A dual trace plug-in amplifier was used on the scope and the second input to the scope was connected directly to the output of the general radio GR oscillator. These two signal inputs, to the scope, were balanced and added algebraically in the oscilloscope so that any difference in the frequency of the inputs would make the scope trace appear as a modulated carrier. The frequency of this modulation would then be the frequency of the difference between the two input signals.

FIG. 2 of the above drawing shows a layout of the test equipment. The tube assembly was suspended vertically in a vertical shaft so that it could be released with an electrical solenoid. A retention line was attached to the tube at the top of the shaft so that the tube could fall just slightly more than 16 feet. A surgical rubber hose was tied to the retention line and tube assembly so as to take up the shock of the tube when it reached the end of its downward descent at the end of the retention line. Coaxial lines were connected from the tube assembly to the oscilloscope and the amplifier which were sitting adjacent the shaft. The temperature of the air in the shaft was measured using a calibrated mercury thermometer. The frequency of the source was calibrated by using a Berkly counter.

In the test procedure, the tube was dropped five different times and photographs were taken of the oscilloscope trace during the free fall of the tube assembly. The frequency of the oscillator was adjusted so that the phase relationship of the signal inputs to the oscilloscope were 180° out of phase.

Some changes may be made in the construction and arrangement of my ACCELEROMETER without departing from the real spirit and purpose of my invention, and it is my intention to cover by my claims, any modified forms of structure or use of mechanical equivalents which may be reasonably included within their scope.

I claim:

1. The combination of an accelerometer and a vehicle, comprising:
   a vehicle,
   a wave frequency emitter means comprising a noise source and a tuned cavity on said vehicle,
   a wave frequency receiver means comprising a noise detector apparatus on said vehicle and adapted to detect from one direction the wave frequency emitted by said wave frequency emitter means and in spaced relation to said wave frequency emitter means,
   means on said vehicle comprising first dielectric wave guides which communicate between said tuned cavity wave frequency emitter means and said wave frequency receiver means and are adapted to present substantially directly to said wave frequency receiver means a wave frequency substantially identical to the wave frequency of said wave frequency emitter means at the time of emission therefrom,
   second dielectric wave guides also communicating between said tuned cavity wave frequency emitter means and said wave frequency receiver means and adapted to provide a much slower velocity of propogation of the energy of the emitted wave frequency than that of said first dielectric wave guides, and
   means on said vehicle adapted to register the difference between the wave frequency presented substantially directly to said wave frequency receiver means and the wave frequency emitted from said wave frequency emitter means and transmitted through said first and second wave guides as detected by said wave frequency receiver means; and wave frequency difference being proportional to the acceleration of said vehicle.

2. The combination of an accelerometer and a vehicle, comprising:
   a vehicle,
   a wave frequency emitter means comprising a noise source and a tuned cavity on said vehicle,
   a wave frequency receiver means comprising a noise detector apparatus on said vehicle and adapted to detect from one direction the wave frequency emitted by said wave frequency emitter means and in spaced relation to said wave frequency emitter means, said wave frequency receiver positioned at one end of said vehicle and said wave frequency emitter being positioned at the opposite end of said vehicle from said wave frequency receiver, said wave frequency receiver and said wave frequency emitter also positioned on a line which is substantially parallel to the line of travel of said vehicle,
   means on said vehicle comprising first dielectric wave guides which communicate between said tuned cavity wave frequency emitter means and said wave frequency receiver means and are adapted to present substantially directly to said wave frequency receiver means a wave frequency substantially identical to the wave frequency of said wave frequency emitter means at the time of emission therefrom,
   second dielectric wave guides also communicating between said tuned cavity wave frequency emitter means and said wave frequency receiver means and adapted to provide a much slower velocity of propogation of the energy of the emitted wave frequency than that of said first dielectric wave guides, a low-pass filter means on said vehicle and adapted to pass only the wave frequency difference between the wave frequency presented substantially directly to said wave frequency receiver means by said first dielectric wave guides and the wave frequency presented to said wave frequency receiver means by said second dielectric wave guides; said wave frequency difference being proportional to the acceleration of said vehicle, and an indicator means on said vehicle and adapted to register said wave frequency difference.

3. The combination of an accelerometer and a vehicle, comprising:

a vehicle, an electromagnetic emitter means on said vehicle, a detector means on said vehicle in spaced relation to said electromagnetic emitter means, said electromagnetic means positioned at one end of said vehicle and said detecting means positioned at the opposite end of said vehicle from said electromagnetic emitter means, said electromagnetic emitter means and said detecting means also positioned on a line which is substantially parallel to the line of travel of said vehicle, means on said vehicle comprising a first dielectric wave guide which communicates between said electromagnetic emitter means and said detecting means and is adapted to present substantially directly to said detector means a wave frequency substantially identical to the wave frequency of said emitter means at the time of emission therefrom, second dielectric wave guides arranged in parallel relation to the line of vehicle travel also communicating between said emitter means and said detector and adapted to provide a much slower velocity of propogation of energy of the emitted wave frequency than that of said first dielectric wave guide, and means on said vehicle connected to said detector to receive the mixed signals from said first dielectric wave guide and said second dielectric wave guides from one direction and adapted to register the difference between the wave frequency presented substantially directly to said detector and the wave frequency emitted from said electromagnetic emitter, said wave frequency difference being proportional to the acceleration of said vehicle.

4. The combination of claim 3 wherein said second dielectric wave guides are bent back and forth upon one another such that the electromagnetic radiation going away from the emitter moves with a velocity of light and that the velocity of the electromagnetic radiation coming back towards the emitter is greatly reduced by the high dielectric constant material.

5. The combination of an accelerometer and a vehicle, comprising:

a vehicle, a laser beam emitter means on said vehicle a detector means on said vehicle in spaced relation to said laser beam emitter means, said laser beam means positioned at one end of said vehicle and said detecting means positioned at the opposite end of said vehicle from said laser beam emitter means, said laser beam emitter means and said detecting means also positioned on a line which is substantially parallel to the line of travel of said vehicle, means on said vehicle comprising a first dielectric wave guide which communicates between said laser beam emitter means and said detecting means and is adapted to present substantially directly to said detector means a wave frequency substantially identical to the wave frequency of said laser beam means at the time of emission therefrom, said dielectric wave guides arranged in parallel relation to the line of vehicle travel also communicating between said laster beam means and said detector and adapted to provide a much slower velocity of propogation of energy of the emitted wave frequency than that of said first dielectric wave guide, and means on said vehicle connected to said detector to receive the mixed signals from said first dielectric wave guide and said second dielectric wave guides from one direction and adapted to register the difference between the wave frequency presented substantially directly to said detector and the wave frequency emitted from said laser beam emitter, said wave frequency difference being proportional to the acceleration of said vehicle.

6. The combination of claim 5 wherein at least a part of said first and second dielectric wave guides are comprised of optic fibers.

7. The combination of claim 6 wherein said second dielectric wave guides are arranged in serpentine fashion in parallel relation to the line of vehicle travel, with the portions thereof carrying wave frequencies opposite to the direction of vehicle travel having a lower dielectric constant than the portions thereof carrying wave frequencies in the direction of vehicle travel.

* * * * *